United States Patent [19]
Müller

[11] 3,975,859
[45] Aug. 24, 1976

[54] METHOD AND MEANS FOR COVERING LOW PLANT GROWTHS

[75] Inventor: Jean-Pierre Müller, Hauterive, Switzerland

[73] Assignee: Breveteam, S. A., Fribourg, Switzerland

[22] Filed: May 21, 1975

[21] Appl. No.: 579,421

[52] U.S. Cl. .......................................... 47/31; 47/9; 111/1; 428/131
[51] Int. Cl.² ............................................ A01G 13/02
[58] Field of Search ............... 47/9, 56, 26–31, 47/20–21; 111/1; DIG. 1; 428/131

[56] References Cited
UNITED STATES PATENTS

| 1,544,322 | 6/1925 | Kellermann | 47/31 |
| 2,974,442 | 3/1961 | Womelsdorf | 47/26 |
| 3,181,273 | 5/1965 | West et al. | 47/26 |
| 3,362,106 | 1/1968 | Goldring | 47/56 |
| 3,559,599 | 2/1971 | Hoadley | 47/26 X |
| 3,805,446 | 4/1974 | Aoyagi | 47/9 |

FOREIGN PATENTS OR APPLICATIONS

| 2,348,512 | 4/1974 | Germany | 47/9 |
| 491,253 | 7/1970 | Switzerland | 47/20 |

*Primary Examiner*—Robert E. Bagwill
*Attorney, Agent, or Firm*—Bacon & Thomas

[57] ABSTRACT

A method and article for horticultural protection of plant growths during the maturation thereof whereby the volume exchange of oxygen, carbon dioxide, and moisture is controlled in accordance with the demands thereof during maturation.

15 Claims, 7 Drawing Figures

METHOD AND MEANS FOR COVERING LOW PLANT GROWTHS

BACKGROUND OF THE INVENTION

1. Field of the Invention

The present invention relates to a method of horticultural protection of plant growths during the maturation thereof whereby the volume exchange of oxygen, carbon dioxide, and moisture between the plant and ambient environment is controlled in accordance with the demands thereof by the plant growth during the maturation period. Also, the present invention relates to the article to affect this horticultural protection.

2. Descrption of the Prior Art

The prior art recognizes both the need and desirability to afford horticultural protection for plant growth during the maturation thereof. Various forms of plastic webs or other agronomic mulch sheets have been fashioned to aid in the tillage of plants, crops and the like.

The application of such webs as a means for providing climatic control about a local area surrounding the plants under cultivation has been known for many years. For example, U.S. Pat. No. 3,580,196 relates to an agronomic mulch sheet possessing a plurality of openings in a row therein. Each of these openings is provided with a slit or other means to allow an expansion of the opening upon subsequent growth of the plant therethrough. Such an agronomic mulch web is capable of retaining the soil surrounding the plant in place and confines plant growth to a uniform row defined by the openings of the web. As growth proceeds, the mulch will lie adjacent the surface of the ground. Once the plants have gained a substantial size, the plastic mulch sheet may be removed directly over the plants by virtue of the openings capable of expansion.

French Pat. Nos. 1,589,499 and 2,056,070 and German Offelegungsschrift No. 2,348,512 all relate to conceptually similar agronomic mulch sheets suitable for limited horticultural protection.

By and large, the prior art mulch webs are deficient in one or more aspects. Typically, the perforations formed in the web are tightly closed when the sheet is applied to the soil. This results in an enrichment of the environment between the web and the soil with carbon dioxide released by ground. Such enrichment of carbon dioxide is known to be prejudicial to the development of young plants. Even in the event that the perforations are not entirely sealed, the relative distance between adjacent holes is typically substantial, thus resulting in gradients in carbon dioxide concentration which, too, is undesirable. Also, until plant growth has reached substantial proportion, these webs minimize the free exchange of moisture which may be deleterious to healthy establishment of plants during the incipient stages of growth. Furthermore, such tightly closed mulch sheets do not allow convenient irrigation of the plants. Most of the irrigation water flows away, whereas the water which passes through the perforations erodes the soil surrounding the plants, even though the quantity of water is not sufficient for the plants.

Moreover, the minimal amount of protection afforded the plant substantially ceases once the stem or foliage protrudes above the level of the web. The mulch sheet must then, generally, be removed or possibly contribute to a restriction of healthy maturation. The removal of the web after the protrusion of the foliage can also damage the tender shoots as they are pulled back through the openings.

Accordingly, a need exists to provide horticultural protection for flora both during the pre-emergence and subsequent maturation thereof. Moreover, the need exists to provide such protection which will minimize soil erosion during pre-emergent stages but which will allow sufficient irrigation of the plants. Additionally, the need exists to provide such horticultural protection which is free from characteristics contributing to either an excessive accumulation of carbon dioxide, as well as undesirable gradients thereof, beneath the horticultural web.

SUMMARY OF THE INVENTION

To obviate the deficiencies of the prior art, it is a major object of the present invention to provide horticultural protection for flora whereby the volume exchange of oxygen, carbon dioxide, and moisture is controlled in accordance with the demands thereof during the maturation period.

It is also an object of the present invention to provide such protection whereby soil erosion is virtually precluded.

It is still another object of this invention to provide horticultural protection for maturing plant growth by means of a resiliently expandable web whereby maturation is achieved without the need to remove the web in order to give way to plant growth.

It is yet a further object of the present invention to provide a web for horticultural protection whereby the web expands in response to plant growth which occurs entirely beneath the web structure.

These and other advantages of the present invention will become apparent upon examination of the following description when taken in conjunction with the appended figures of drawing.

In accordance with the present invention, it has been determined that the above objects may be achieved by providing a web of resiliently deformable material bearing a plurality of staggered perforations therein. The perforations are designed to be of such a dimension that plant growth therethrough is precluded. The web may be disposed upon the soil prior to, or after, emergence of the flora for which protection is desired and is secured to the ground along the peripheral edges thereof. Subsequent growth causes expansion of the web in a predominately transverse fashion whereby the perforations are likewise caused to expand, thereby providing for increased volume exchange of oxygen, carbon dioxide and moisture in accordance with the demands thereof during such growth.

DETAILED DESCRIPTION OF THE INVENTION

In order to more fully demonstrate the objects and advantages of the present invention, the following detailed description will be given in terms of various preferred embodiments thereof, the same being intended as illustrative and in no wise limitative.

Figure 1:
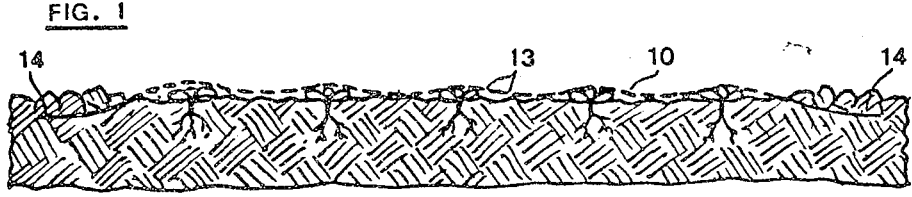
FIG. 1 is a diagrammatic side elevational view of the protective web of the present invention shown lying upon the soil prior to emergence of the plant growth.
Figure 2:
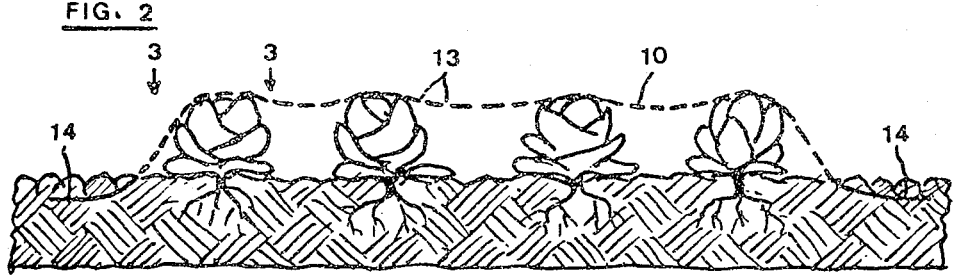
FIG. 2 is a diagrammatic side elevational view, similar to FIG. 1, but showing the manner in which the protective web envelops the plant growth.
Figure 3:
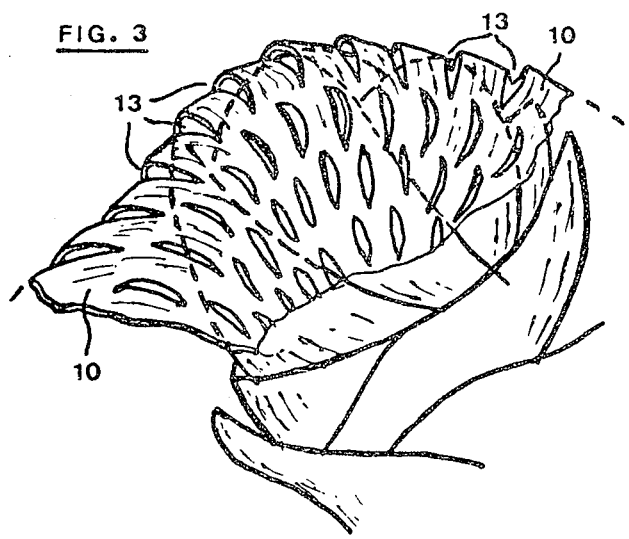
FIG. 3 is an enlarged, fragmentary side elevational view of the web taken substantially along line 3—3 of FIG. 2, and illustrates the manner in which the perforations separate upon maturation of the plant growth.

FIGS. 1 and 2 diagrammatically depict the general manner in which the protective horticultural web may be used. In contradistinction to the prior art agronomic mulches heretofore employed, the protective web of the present invention is designed to envelop the growing flora while allowing free access of air and moisture therethrough. FIG. 3 illustrates the manner in which the web expands during maturation of the plant growth thereby controlling the volume flow of these necessary constituents to the growing plants. As shown in FIG. 3, the web tends to expand to a greater degree where it is supported by the plants, as compared with the intermediate zones, thus providing a greater opening of the slits therein.

Figure 4:
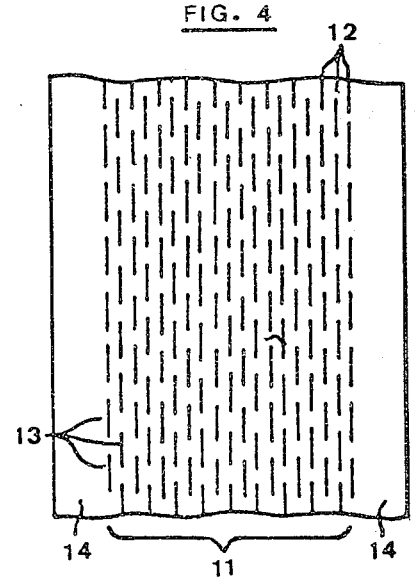
FIG. 4 is a top, sectional view of a portion of the web in accordance with the present invention.

More specifically, FIG. 4 shows a sectional plan view of one embodiment of a protective horticultural web, designed generally as 10, in accordance with the present invention. The web is formed with a central zone 11 having a plurality of rows 12 of slit-like perforations 13. The central zone 11 is bounded on either side by peripheral zones 14 which, in this embodiment, are free from perforations.

The horticultural web 10 may be fabricated from any suitable material having a resiliency which will provide sufficient integrity to the web to allow deformation without tearing. It has been determined that either polyethylene or polyvinylchloride may be admirably employed to these ends, with polyethylene being preferred for economical and toxicity considerations. For any synthetic polymeric materials used to fabricate web 10, it is important that the components therefor, as for instance the plasticizers and stabilizers, have no detremental effects on human beings or plants either. The web should be of sufficient thickness that it will neither tear upon deformation resulting from subsequent plant growth nor be too thick to interfere therewith. It has been determined that polyethylene sheeting of from 0.03 to 0.10 mm is preferable to harmonize these needs.

As is shown in FIG. 4, the rows of slits are staggered and mutually overlapping, which configuration is desirable to allow the requisite transverse expansion of the web during growth. The individual slits must be of such a dimension that incipient shoots from the flora do not easily pass therethrough but, to the contrary, are retained beneath the plane defined by the web. It has been found that slit lengths ranging from about 2 to about 12 mm. adequately function in this respect. The distances between successive slits within a given row, as well as between adjacent rows, may vary widely depending upon the desired degree of extensibility of the web during use. Preferably, however, the relative distances between the slits, as well as between adjacent rows, are no greater than the individual slit lengths.

A relevant factor in deciding upon the slit lengths and, thus, their relative positioning in the web, is the force required to expand the web transversely of the perforations, it being appreciated that the sole force to achieve the necessary expansion and displacement rises from the tender shoots emerging from the ground. Typically, the web will be designed such that a minimal tension of a few grams in the transverse direction will cause the required deformation. The pressure of the protuberances emerging from the soil, such as stones or clods, or shoots, will have the effect to expand the web locally. Also the sag of the web between the tops of the plants on which the web is lying will have the same effect. The latter will be increased if rain water accumulates in the depressions of the web, whereby the water will seep through the web and irrigate the soil under the web. In accordance with this requirement, it has been determined that a density of perforations amounting to approximately 60 to 2,500 slits per square decimeter is preferable.

By way of example, a highly preferred web is fabricated from polyethylene sheeting 0.07 mm. thick. The slits are of 4 mm. in length and are staggered in accordance with the geometry depicted in FIG. 4. The distance separating successive slits in a given row is 2.7 mm. while adjacent rows are separated by 2 mm. Such a pattern will result in an approximate density of 600 to 1,000 slits per square decimeter. A slight amount of transverse tension, approximately 2 grams, will result in expansion of the edges of the slits to yield about 8 to 12 openings per square centimeter as opposed to prior art webs possessing about 1 perforation per square decimeter.

Having thus been fashioned, the web may be placed upon the ground immediately after seeding and secured along the peripheral zone 14, as depicted in FIG. 1. The slits, in this untensioned condition, are substantially closed with longitudinal edges thereof lying fairly close together. The slits will allow sufficient moisture to enter the ground to promote germination but will preclude the erosion of the soil surrounding the seed. After germination and emergence, the shoots will cause sufficient transverse forces to provide deformity of the web, as diagrammatically depicted in FIGS. 2 and 3. As the plant continues to grow and, thus, demands a greater volume exchange of oxygen, carbon dioxide and moisture, the forces on web 10 will cause greater expansion of slits 13 to accommodate this increasing need.

Figure 5:
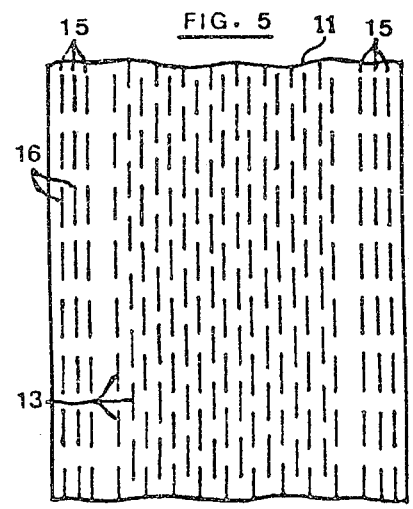
FIG. 5 is a top, sectional view, similar to that of FIG. 4, but showing another embodiment of the web in accordance with the present invention.

FIG. 5 illustrates an alternate embodiment of the web according to the present invention, wherein like numerals designate like features. It can be seen that the central zone 11 is now bounded by peripheral zone 14 which, in this embodiment, also possesses a plurality of rows 15 of perforations 16. However, the perforations in this embodiment are not staggered. The function of these peripheral perforations 16 is to assure a permeability to water, while the resistance to tearing forces is increased with respect to the central zone 11 bearing the staggered perforations 13. The web in accordance with FIG. 5 functions substantially identically with that described in connection with FIG. 4.

Figure 6:
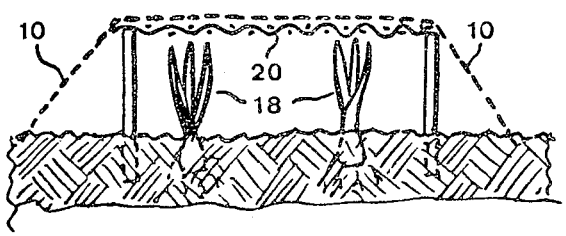
FIG. 6 is a diagrammatic side elevational view, similar to that of FIG. 2, illustrating a support member in accordance with an alternate embodiment of the present invention; and, FIG. 7 is a diagrammatic side elevational view, similar to that of FIG. 1, illustrating the protective web in accordance with an alternate embodiment of the present invention.

FIG. 6 illustrates yet another embodiment in accordance with the present invention which is desirable for protecting fragile plants. While the foregoing description of the horticultural web can be seen to achieve the objects and advantages when used in conjunction with plants exhibiting a certain load-bearing ability such as, for example, radishes, lettuce, endives, turnips, cabbages, rhubarb, and the like, plants which possess exceedingly tender shoots such as, for example, asparagus, require added protection. The embodiment of FIG. 6 illustrates the web 10 protecting such fragile shoots 18 with a support 20 interposed therebetween. The support may be made from any suitable stock such as, for example, wire mesh. Support 20 is manually raised in accordance with the development of shoots 18 with protective web 10 affording all the objects and advantages heretofore described. In some cases it may be preferable to place the support 20 at its maximum height when placing the web on the support immediately after seeding so that no further adjustment of the height is necessary during the plant growth.

Figure 7:
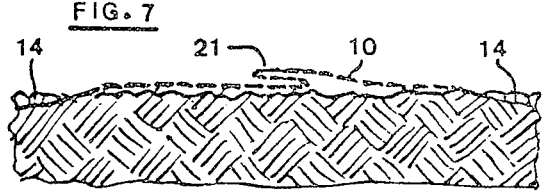

FIG. 7 illustrates yet another embodiment in accordance with the present invention which is desirable for protecting high growing plants. The web 10 is placed upon the ground immediately after seeding and secured along the peripheral zone 14 in a similar manner as depicted in FIG. 1. However, there is provided at least one longitudinal fold 21 in the web, so that the web may be lifted by the growing plants up to a predetermined height, whereby said fold is unfolded before the web is forced to expand transversely of the perforations. By this way tender shoots are not depressed by the web until they have reached a certain height.

While the invention has now been described in terms of various preferred embodiments thereof, the skilled artisan will appreciate that yet other modifications, substitutions, and alterations may be made without departing from the spirit thereof. Accordingly, it is intended that the invention be restricted only by the scope of the following claims.

I claim:

1. A method for horticultural protection of plant growth during the maturation thereof whereby there is provided an interchange of oxygen, carbon dioxide and moisture between the area surrounding the plant growth and the ambient environment, comprising the steps of:
   a. placing a resiliently deformable, perforate web capable of transverse expansion over ground having seeds or seedlings therein which, upon development, will present primary foliage of a dimension greater than the largest dimension of the individual perforations of said web;
   b. securely affixing the peripheral edges of said web to the ground such that said web is retained in place over said ground but is yet capable of sufficient transverse expansion to envelop said plant growth during maturation; and,
   c. allowing said plant growth to mature substantially completely beneath said web causing said perforations of said web to expand thus permitting transverse expansion thereof in response to maturation of said plant growth and allow greater volume exchange of oxygen, carbon dioxide, and moisture in accordance with an increasing demand thereof due to said maturation.

2. The method of claim 1, including placing said web over said seed prior to emergence thereof, whereby the perforations of said web are substantially unexpanded thereby reducing the propensity for erosion of the ground proximate said seed, said perforations remaining unexpanded until said plant growth emerges beneath said web causing deformation and subsequent expansion thereof, thus permitting the increased interchange of oxygen, carbon dioxide, and moisture.

3. The method of claim 1, wherein said perforations comprise rows of slits parallel to the longitudinal axis of said web in a staggered and mutually overlapping fashion thus allowing expansion of said web transverse to said axis.

4. The method of claim 1, including placing said perforate web over said plant growth after emergence thereof.

5. The method of claim 1, further comprising the step of placing a support member intermediate said web and said plant growth, whereby fragile shoots thereof are further protected.

6. The method of claim 1, wherein said web is placed over said plant growth including at least a longitudinal fold in the web; whereby said web is lifted by the growing plants up to a predetermined height before the perforations of said web are caused to expand.

7. An article for horticultural protection of plant growth during the maturation thereof whereby the volume exchange of oxygen, carbon dioxide, and moisture is influenced in accordance with the demands thereof during said maturation, said article comprising a web of resiliently deformable material having a plurality of perforations formed therein in a central zone longitudinally disposed along said web, said perforations comprising rows of slits parallel to the longitudinal axis of said web wherein:
   a. said slits are each from about 2 mm to about 12 mm in length;
   b. successive slits in each of said rows are separated by a distance of from about 2 mm to about 12 mm;
   c. successive rows of slits are separated by a distance of from about 2 mm to about 12 mm; and,
   d. said web is from about 0.03 mm to about 0.10 mm in thickness, whereby said plant growth is confined beneath said web.

8. The article of claim 7, wherein said rows of slits are formed such that the slits of one row are staggered with respect to the slits of immediately adjacent rows.

9. The article of claim 8, wherein said central zone is bounded on either side by peripheral zones having rows of slits formed therein, the slits in each of said rows in each of said peripheral zones being unstaggered.

10. The article of claim 7, wherein said resiliently deformable material is synthetic polymeric material.

11. The article of claim 10, wherein said polymeric material is selected from the group comprising polyethylene and polyvinylchloride.

12. The article of claim 7, wherein the number density of said slits is from about 60 to about 2,500 slits per $dm^2$.

13. In combination with the article of claim 12, a support element disposed intermediate said web and said plant growth.

14. The method of manufacturing a perforate web for horticultural protection of plant growth during the maturation thereof whereby there is provided an interchange of oxygen, carbon dioxide and moisture between the area surrounding the plant growth and the ambient environment, said method comprising the steps of:
   a. slitting individual perforations of from about 2 mm to about 12 mm in length in said web;

b. slitting said individual perforations in a longitudinal row along said web where said individual perforations are separated from successive slits by a distance of from about 2 mm to about 12 mm in length; and c. slitting a plurality of said rows transversely across said web where individual rows of slits are separated from successive rows of slits by a distance of from about 2 mm to about 12 mm in length.

15. The method of claim 14, wherein said forming step includes slitting said perforations at a number density ranging from about 60 to about 2,500 slits per $dm^2$.

* * * * *